United States Patent
Chang et al.

(10) Patent No.: US 8,594,719 B2
(45) Date of Patent: Nov. 26, 2013

(54) APPARATUS AND METHOD FOR CONTROLLING TRANSMISSION POWER IN WIRELESS COMMUNICATION SYSTEM

(75) Inventors: Chung-Ryul Chang, Yongin-si (KR); June Moon, Seoul (KR); Jae-Yun Ko, Anyang-si (KR); Sung-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 12/927,070

(22) Filed: Nov. 5, 2010

(65) Prior Publication Data

US 2011/0177837 A1    Jul. 21, 2011

(30) Foreign Application Priority Data

Jan. 20, 2010    (KR) .................. 10-2010-0005366

(51) Int. Cl.
*H04B 7/00*    (2006.01)

(52) U.S. Cl.
USPC .................. 455/522; 455/63.1; 455/67.11

(58) Field of Classification Search
USPC ............ 455/522, 524, 63.1, 67.11, 67.13, 68, 455/69
See application file for complete search history.

(56) References Cited

U.S. PATENT DOCUMENTS

| | | | |
|---|---|---|---|
| 7,042,856 B2 | 5/2006 | Walton et al. | |
| 2006/0262750 A1 | 11/2006 | Walton et al. | |
| 2007/0060062 A1 | 3/2007 | Wengerter et al. | |
| 2007/0280183 A1* | 12/2007 | Cho et al. | 370/338 |
| 2008/0026782 A1* | 1/2008 | Kwon et al. | 455/522 |
| 2008/0045260 A1* | 2/2008 | Muharemovic et al. | 455/522 |
| 2008/0188260 A1* | 8/2008 | Xiao et al. | 455/522 |
| 2008/0261645 A1* | 10/2008 | Luo et al. | 455/522 |
| 2009/0221297 A1 | 9/2009 | Wengerter et al. | |
| 2009/0227247 A1* | 9/2009 | Byun et al. | 455/423 |
| 2010/0029212 A1 | 2/2010 | Malladi et al. | |

FOREIGN PATENT DOCUMENTS

| | | |
|---|---|---|
| EP | 1 876 854 A1 | 1/2008 |
| EP | 2 053 884 A2 | 4/2009 |
| KR | 1020100006144 A | 1/2010 |
| WO | WO 2010/005236 A2 | 1/2010 |

OTHER PUBLICATIONS

International Search Report dated May 13, 2011 in connection with International Patent Application No. PCT/KR2010/006419.

* cited by examiner

*Primary Examiner* — Ping Hsieh (57) ABSTRACT

An apparatus and method controls transmission power by a Base Station (BS) of a wireless communication system by considering a path loss between the BS and a terminal and interference affecting adjacent cells. A receiver receives information about interference from adjacent BSs and a terminal. A calculator calculates transmission power of the terminal using the information about interference received from the adjacent BSs and the terminal. The information about interference received from the adjacent BSs comprises Noise & Interference (NI) values, and the information about interference received from the terminal includes a path loss value.

22 Claims, 5 Drawing Sheets

APPARATUS AND METHOD FOR CONTROLLING TRANSMISSION POWER IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Jan. 20, 2010 and assigned Serial No. 10-2010-0005366, the entire disclosure of which is hereby incorporated by reference.

TECHNICAL FIELD OF THE INVENTION

The present invention relates to an apparatus and method for controlling transmission power in a wireless communication system.

BACKGROUND OF THE INVENTION

The next-generation multimedia wireless communication systems, which have recently been actively studied, are required to process a variety of information such as video and wireless data at a higher data rate beyond the early voice-oriented service.

To this end, the wireless communication systems use a power control scheme as one method for reducing path losses associated with Base Stations (BSs) and their terminals and also reducing inter-cell interference caused by interference from adjacent cells. The power control scheme is a scheme that adjusts transmission power to transmit data with the lowest possible power level while maintaining Quality of Service (QoS) of the wireless communication systems at a threshold or above.

Meanwhile, if uplink transmission power is low, BSs cannot receive transmission signals from terminals. In contrast, if uplink transmission power is high, transmissions signals of terminals may cause interference to transmission signals of other terminals, and battery consumptions of the terminals also increase.

If the uplink transmission power is controlled, strengths of received signals are maintained at an optimal level, making it possible to prevent the unnecessary power consumption in terminals. In addition, if the uplink transmission power is controlled, data rates are adaptively determined, contributing to improvement of transmission efficiency.

As noted above, uplink performance of the wireless communication systems is determined based on the transmission power of terminals.

To control transmission power, wireless communication systems use two different approaches: an open-loop power control scheme and a closed-loop power control scheme. First, the open-loop power control scheme measures or estimates downlink signal attenuation to predict uplink signal attenuation, and compensates uplink transmission power based on the predicted uplink signal attenuation. The closed-loop power control scheme determines uplink transmission power based on the properties of transmission data or the amount of wireless resources allocated to a particular terminal.

The closed-loop power control scheme adjusts uplink transmission power using feedback information for transmission power control, which is exchanged between BSs and terminals.

The most important thing in determining the uplink transmission power is to determine a level of uplink transmission power that is set for each terminal. The uplink transmission power, which is set for each terminal, is determined mainly depending on the level of compensating for a path loss between the terminal and its BS. A method for determining uplink transmission power includes, for example, Fractional Power Control (FPC) proposed by Long Term Evolution (LTE).

Figure 1:
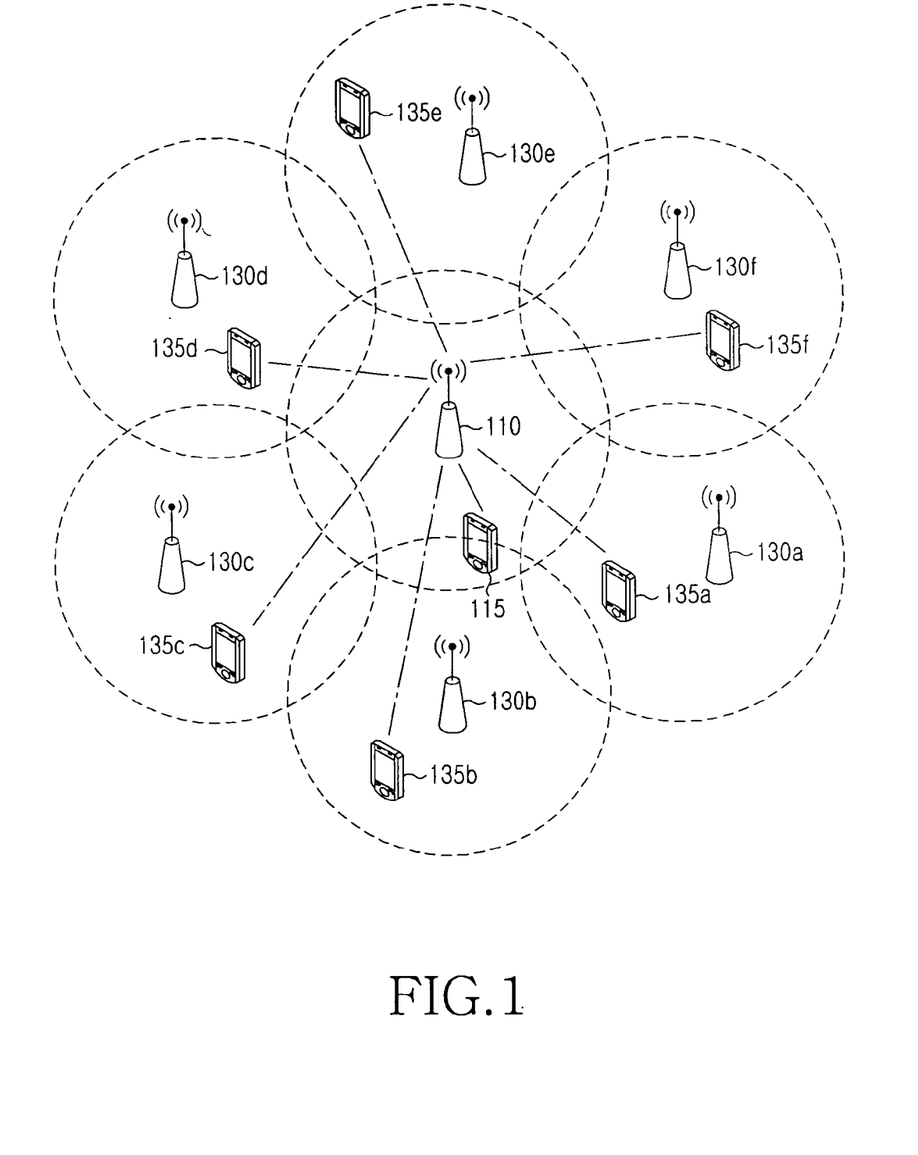
FIG. 1 illustrates a general wireless communication system for controlling uplink transmission power.

FIG. 1 illustrates a general wireless communication system for controlling uplink transmission power.

The wireless communication system includes a terminal 115, a serving BS 110 communicating with the terminal 115, adjacent BSs 130a-130f, and terminals 135a-135f communicating with the adjacent BSs 130a-130f, respectively.

The terminal 115 determines a strength of transmission power based on information about transmission power received from the serving BS 110 and transmits data using the transmission power of the determined strength. The signal transmitted by the terminal 115 is affected by the interference of signals transmitted by the respective terminals 135a-135f communicating with the adjacent BSs 130a-130f. In addition, based on the scheduling policy of each BS, terminals transmitting signals are changed in every allocation of resources such as time and frequency.

As stated above, the conventional uplink transmission power control method considers only the path loss between the serving BS and its terminal, but does not consider the interference affecting the adjacent cells. Hence, there is a need to optimize the overall system performance by considering not only the path loss between the serving BS and the terminal, but also the interference affecting the adjacent cells, during uplink transmission power control.

SUMMARY OF THE INVENTION

To address the above-discussed deficiencies of the prior art, it is a primary object to provide at least the advantages described below. Accordingly, an aspect of the present invention provides an apparatus and method for controlling transmission power in a wireless communication system.

Another aspect of the present invention provides a transmission power control apparatus and method for controlling uplink transmission power based not only on a path loss between a serving BS and a terminal, but also on interference affecting adjacent cells.

Another aspect of the present invention provides an apparatus and method for maximizing a sum log rate of all terminals in the network considering interference affecting adjacent cells.

Yet another aspect of the present invention provides an apparatus and method for effectively improving an uplink rate by maximizing an uplink sum log rate.

In accordance with one aspect of the present invention, there is provided an apparatus for controlling transmission power by a Base Station (BS) of a wireless communication system. The apparatus includes a receiver for receiving information about interference from adjacent BSs and a terminal. A calculator calculates transmission power of the terminal using the information about interference received from the adjacent BSs and the terminal. The information about interference received from the adjacent BSs comprises Noise & Interference (NI) values, and the information about interference received from the terminal comprises a path loss value.

In accordance with another aspect of the present invention, there is provided a method for controlling transmission power by a Base Station (BS) of a wireless communication system. The method includes receiving information about interference from adjacent BSs and a terminal. A transmission power of the terminal is calculated using the information about interference received from the adjacent BSs and the terminal. The information about interference received from the adjacent BSs comprises Noise & Interference (NI) values, and the information about interference received from the terminal comprises a path loss value.

In accordance with another aspect of the present invention, there is provided an apparatus for controlling transmission power by a terminal of a wireless communication system. The apparatus includes a transmitter for transmitting information about interference with adjacent Base Stations (BSs) to a serving BS. A receiver receives information about transmission power from the serving BS. The transmission power may be calculated in the serving BS using the transmitted information about interference with adjacent BSs and information about interference that the serving BS has received from the adjacent BSs. The information about interference with adjacent BSs comprises path loss values with the adjacent BSs, and the information about interference that the serving BS has received from the adjacent BSs comprises Noise & Interference (NI) values of the adjacent BSs.

In accordance with yet another aspect of the present invention, there is provided a method for controlling transmission power by a terminal of a wireless communication system. The method includes transmitting information about interference with adjacent Base Stations (BSs) to a serving BS. Information about transmission power is received from the serving BS. The transmission power may be calculated in the serving BS using the transmitted information about interference with adjacent BSs and information about interference that the serving BS has received from the adjacent BSs. The information about interference with adjacent BSs comprises path loss values with the adjacent BSs, and the information about interference that the serving BS has received from the adjacent BSs comprises Noise & Interference (NI) values of the adjacent BSs.

Before undertaking the DETAILED DESCRIPTION OF THE INVENTION below, it may be advantageous to set forth definitions of certain words and phrases used throughout this patent document:

the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

It should be noted that in the following description, the term "value" is used interchangeably with the term "information."

The performance of wireless communication systems is determined by Signal-to-Interference Ratios (SINRs) of received signals, which indicate a ratio of received signals to their transmitted signals in terms of noise and interference. The strengths of transmission signals are reduced by the path loss.

Cellular systems minimize the distance between BSs to maintain continuous coverage. Because of this, SINRs of received signals are determined based on a level of the interference generated by adjacent BSs, in the downlink, and on a level of the interference generated by terminals communicating with the adjacent BSs, in the uplink. So, in order to effectively improve the performance of wireless communication systems, the level of interference generated by the adjacent cells or the interference occurring to the adjacent cells may be properly controlled.

Because a wireless communication system according to an embodiment of the present invention is the same as the wireless communication system shown in FIG. 1, a detailed description will be omitted.

Now, a process in a terminal for controlling uplink transmission power in a wireless communication system according to an embodiment of the present invention will be described with reference to FIG. 2.

Figure 2:
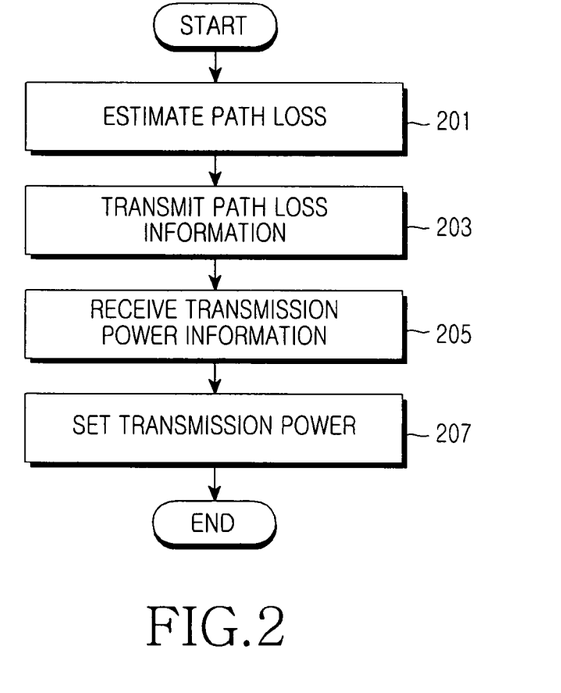
FIG. 2 illustrates a process in a terminal for controlling uplink transmission power in a wireless communication system according to an embodiment of the present invention.

FIG. 2 illustrates a process in a terminal for controlling uplink transmission power in a wireless communication system according to an embodiment of the present invention.

A terminal 115 estimates path losses between the terminal 115 and adjacent BSs 130a-130f in block 201, and transmits information about the estimated path losses to a serving BS 110 in block 203. In block 205, the terminal 115 receives information about transmission power, transmitted from the serving BS 110.

In block 207, the terminal 115 sets transmission power according to the received information about transmission power. The terminal 115 receives information about path losses from the adjacent BSs 130a-130f, or directly estimates the path losses of the adjacent BSs 130a-130f.

Unlike in the common wireless communication systems, the information about transmission power, transmitted from the serving BS 110, includes information about transmission power, calculated in the serving BS 110, as follows. The serving BS 110 calculates the transmission power using information about a path loss, transmitted from the terminal 115, and Noise & Interference (NI) information transmitted from the adjacent BSs 130a-130f.

The path loss is calculated by the terminal 115 using an average strength of a reference signal from each BS, such as a pilot signal and a preamble signal, and a transmission power level of the serving BS 110. Specifically, the path loss may be calculated in the way of dividing the average strength of a reference signal from each BS by the transmission power of the serving BS 110.

Next, a serving BS's operation for controlling uplink transmission power in a wireless communication system according to an embodiment of the present invention will be described with reference to FIG. 3.

Figure 3:
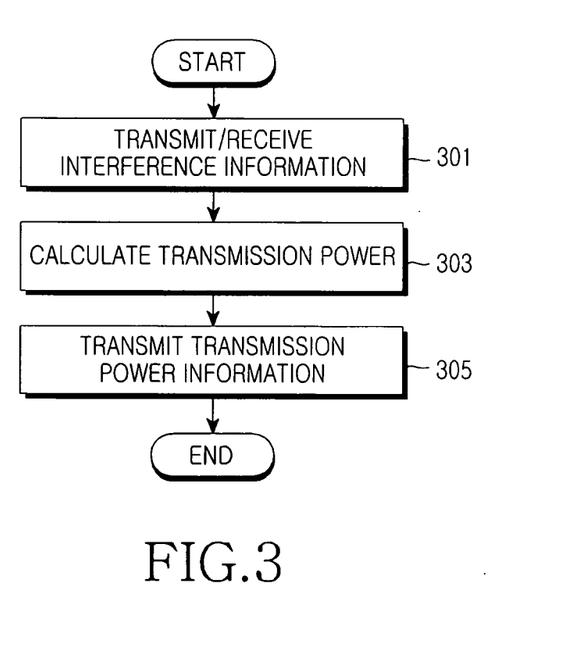
FIG. 3 illustrates a process in a serving base station for controlling uplink transmission power in a wireless communication system according to an embodiment of the present invention.

FIG. 3 illustrates a process in a serving BS for controlling uplink transmission power in a wireless communication system according to an embodiment of the present invention.

In block 301, a serving BS 110 transmits and receives interference information to/from a terminal 115 and adjacent BSs 130a-130f. To be specific, the serving BS 110 receives information about a path loss from the terminal 115. In addition, the serving BS 110 transmits its NI information to the adjacent BSs 130a-130f, and receives NI information of the adjacent BSs 130a-130f from the adjacent BSs 130a-130f. In other words, the serving BS 110 and the adjacent BSs 130a-130f exchange their NI information with each other.

The serving BS 110 may periodically exchange the NI information with the adjacent BSs 130a-130f. In the alternative, the serving BS 110 may send a request for NI information to the adjacent BSs 130a-130f, and then exchange the NI information with the adjacent BSs 130a-130f.

The serving BS 110 calculates transmission power of the terminal 115 using the received path loss information and NI information in block 303, and transmits information about the calculated transmission power to the terminal 115 in block 305.

Next, a mutual operation among a terminal, a serving BS, and adjacent BSs will be described in detail with reference to FIG. 4.

Figure 4:
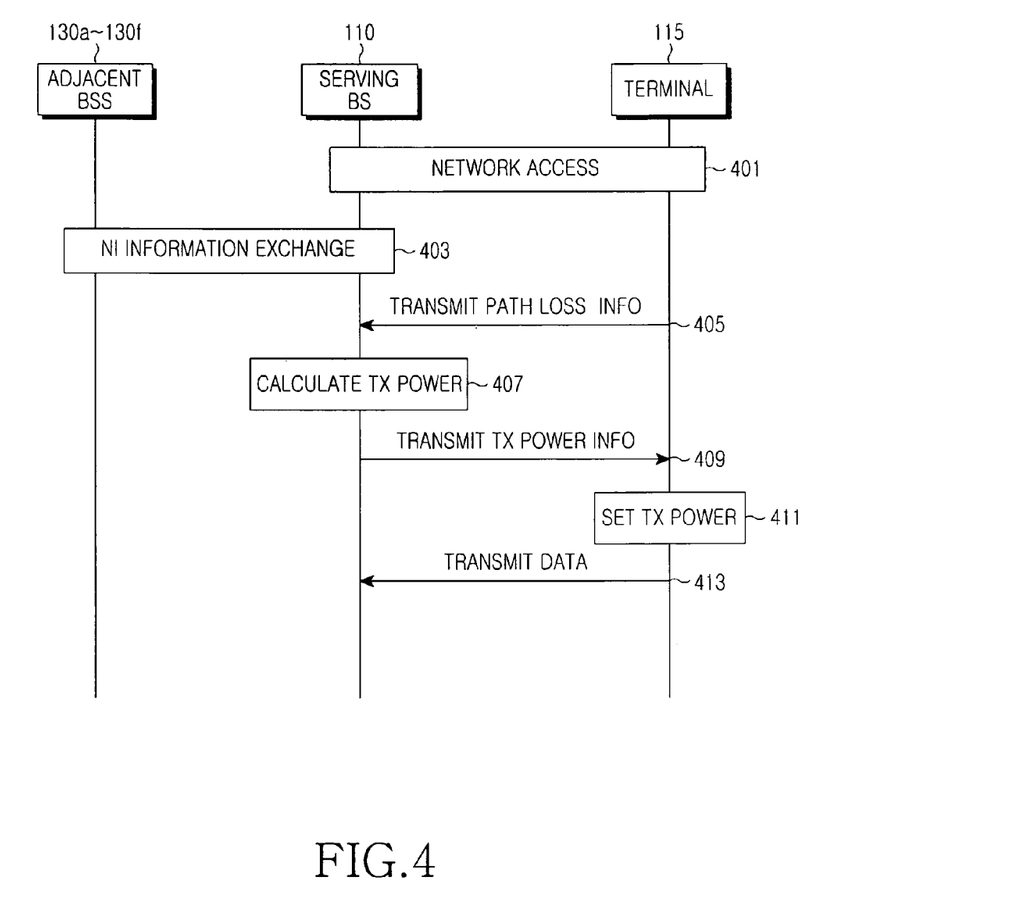
FIG. 4 illustrates a process of controlling uplink transmission power in a wireless communication system according to an embodiment of the present invention.

FIG. 4 illustrates a process of controlling uplink transmission power in a wireless communication system according to an embodiment of the present invention.

In block 401, a serving BS 110 and a terminal 115 make initial access to the network according to a procedure defined in the communication standard. In block 403, the serving BS 110 and adjacent BSs 130a-130f exchange their NI information with each other. The terminal 115 transmits information about its path loss (i.e. 'path loss information 405') to the serving BS 110. The NI information exchange between the serving BS 110 and the adjacent BSs 130a-130f may be performed after or when the serving BS 110 receives the path loss information from the terminal 115.

In block 407, the serving BS 110 calculates transmission power of the terminal 115 using the NI information from the adjacent BSs 130a-130f and the received path loss information. The serving BS 110 then transmits information about the calculated transmission power ('Transmit TX Power Info 409') to the terminal 115.

In block 411, the terminal 115 receives the information about transmission power from the serving BS 110 and sets its transmission power according to the received transmission power information. The terminal 115 transmits data 413 to the serving BS 110 using the set transmission power.

In an embodiment of the present invention, a serving BS calculates transmission power of a terminal, which can maximize an uplink sum rate of the entire network, or maximize an uplink sum log rate of the entire network.

First, the transmission power of a terminal, which can maximize the uplink sum rate of the entire network, will be described.

The transmission power of a terminal, which can maximize the uplink sum rate of the entire network, can be calculated using Equation (1) below.

$$P_n = \frac{1}{\sum_{l \neq k}\left(\frac{G_n^{(l)}}{NI^{(l)}}\right)} \qquad [\text{Eqn. 1}]$$

where $P_n$ denotes a transmission power value of an n-th terminal communicating with a k-th BS, l denotes an index of an adjacent BS, $G_n^{(l)}$ denotes a path loss value from the n-th terminal to the l-th adjacent BS (hereinafter, a 'path loss value of up to the l-th adjacent BS' for short), that the n-th terminal has reported, and $NI^{(l)}$ denotes an NI value of the l-th adjacent BS.

Equation (1) above corresponds to a power control method of maximizing the uplink sum rate of the entire network. The power control method of maximizing the uplink sum rate of the entire network is a method of determining transmission power of a terminal taking into account NI values of adjacent cells to which the terminal gives interference, and a path loss of the terminal.

Specifically, if a terminal causes interference that is greater than or equal to a threshold to adjacent cells (i.e., if a path loss is less than a threshold), the terminal lowers its transmission power. However, even though a terminal causes interference that is greater than or equal to a threshold to adjacent cells, if NI values of the adjacent cells are large, the terminal has no need to significantly reduce the transmission power.

According to this approach, in an embodiment of the present invention, the degree to which the interference generated as a terminal transmits signals affects adjacent cells may be maintained at a certain level.

Meanwhile, a terminal causing interference greater than or equal to a threshold, such as terminals on the sector boundaries or cell boundaries, should lower its transmission power significantly. As a result, uplink data rates of the terminals on the sector boundaries or cell boundaries significantly decrease. In order to satisfy the minimum data rates of terminals, Equation (2) below can be used, in which the minimum transmission power is taken into consideration.

$$P_n = \max\left(\frac{1}{\sum_{l \neq k}\left(\frac{G_n^{(l)}}{NI^{(l)}}\right)}, P_{min}\right), P_{min} = \frac{NI^{(k)}}{G_n^{(k)}} \cdot SINR_{min} \quad [\text{Eqn. 2}]$$

where $P_n$ denotes a transmission power value of an n-th terminal communicating with a k-th BS, l denotes an index of an adjacent BS, $P_{min}$ denotes the minimum transmission power of the n-th terminal, $G_n^{(k)}$ denotes a power loss value of up to the k-th BS, that the n-th terminal has reported, and $NI^{(k)}$ denotes an NI value of the k-th BS. The minimum transmission power $P_{min}$ of the n-th terminal is set to satisfy the minimum SINR ($SINR_{min}$).

Second, the transmission power of a terminal, which can maximize the uplink sum log rate of the entire network, will be described.

The transmission power of a terminal, which can maximize the uplink sum log rate of the entire network, can be calculated using Equation (3) below.

$$P_n = \frac{1}{\sum_{l \neq k}\left(\frac{G_n^{(l)}}{NI^{(l)}} \frac{1}{N_{UE}} \sum_{n' \in \Omega_l}\left(\frac{1}{R_{n'}^l}\right)\right)} \frac{1}{R_n^k} \quad [\text{Eqn. 3}]$$

where $P_n$ denotes a transmission power value of an n-th terminal communicating with a k-th BS, l denotes an index of an adjacent BS, $G_n^{(l)}$ denotes a path loss value of up to the l-th adjacent BS, that the n-th terminal has reported, and $NI^{(l)}$ denotes an NI value of the l-th adjacent BS. Further, $R_{n'}^l$ denotes an average data rate of an n'-th terminal in the l-th adjacent BS, and $R_n^k$ denotes an average data rate of the n-th terminal.

Equation (3) above corresponds to a power control method of maximizing the uplink log sum rate of the entire network. The power control method of maximizing the uplink sum log rate of the entire network is a method of determining transmission power of a terminal taking into account not only the NI values of adjacent cells to which the terminal gives interference, and the path loss of the terminal, but also the average data capacity of adjacent cells and the average data rate of the terminal.

Specifically, if a terminal causes interference greater than or equal to a threshold to adjacent cells (i.e., if a path loss is less than a threshold), the terminal lowers its transmission power. However, even though a terminal causes interference greater than or equal to a threshold to adjacent cells, if NI values of the adjacent cells are large, the terminal has no need to significantly reduce the transmission power.

According to the method described above, the degree to which the interference generated as a terminal transmits signals affects adjacent cells may be maintained at a certain level. In addition, in an embodiment of the present invention, as data rates of adjacent cells are lower, transmission power of the terminal is reduced, and as a data rate of the terminal is lower, the transmission power increases.

Meanwhile, a terminal causing interference greater than or equal to a threshold, such as terminals on the sector boundaries or cell boundaries, should lower its transmission power significantly. As a result, uplink data rates of the terminal causing interference greater than or equal to a threshold significantly decreases. In order to satisfy the minimum data rate of the terminal causing interference that is greater than or equal to a threshold, Equation (4) below can be used, in which the minimum transmission power is taken into account.

$$P_n = \max\left(\frac{1}{\sum_{l \neq k}\left(\frac{G_n^{(l)}}{NI^{(l)}} \frac{1}{N_{UE}} \sum_{n' \in \Omega_l}\left(\frac{1}{R_{n'}^l}\right)\right)} \frac{1}{R_n^k}, P_{min}\right), \quad [\text{Eqn. 4}]$$

$$P_{min} = \frac{NI^{(k)}}{G_n^{(k)}} \cdot SINR_{min}$$

where $P_n$ denotes a transmission power value of an n-th terminal communicating with a k-th BS, l denotes an index of an adjacent BS, $G_n^{(l)}$ denotes a path loss value of up to the l-th adjacent BS, that the n-th terminal has reported, and $NI^{(l)}$ denotes an NI value of the l-th adjacent BS. In addition, $R_{n'}^l$ denotes an average data rate of an n'-th terminal in the l-th adjacent BS, and $R_n^k$ denotes an average data rate of the n-th terminal. Further, $G_n^{(k)}$ denotes a path loss value of up to the k-th BS that the n-th terminal has reported, and $NI^{(k)}$ denotes an NI value of the k-th BS. $P_{min}$ denotes the minimum transmission power of the n-th terminal, and the minimum transmission power is set to satisfy the minimum SINR ($SINR_{min}$).

Figure 5:
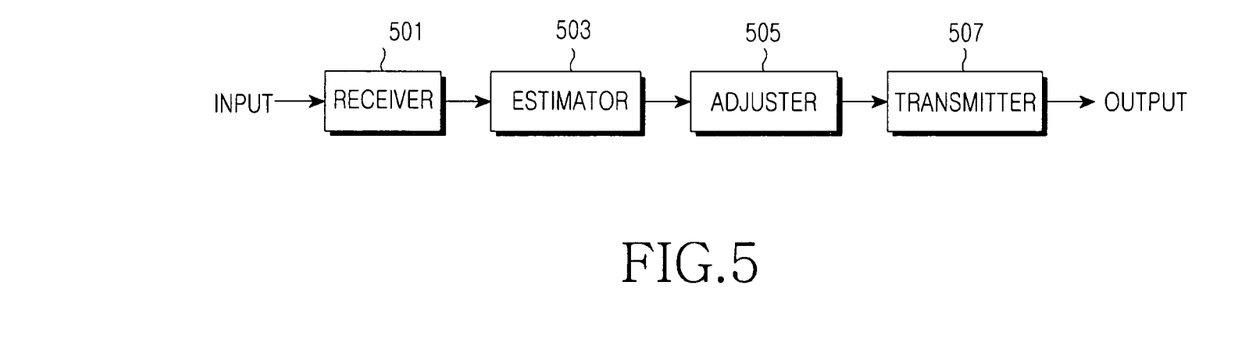
FIG. 5 illustrates a terminal for controlling uplink transmission power in a wireless communication system according to an embodiment of the present invention.

FIG. 5 illustrates a terminal for controlling uplink transmission power in a wireless communication system according to an embodiment of the present invention.

Referring to FIG. 5, the terminal includes a receiver 501, an estimator 503, an adjuster 505, and a transmitter 507.

The receiver 501 receives path loss values transmitted from adjacent BSs.

The estimator 503 detects the adjacent BSs, and estimates path loss values between the terminal and the adjacent BSs.

The adjuster 505 adjusts transmission power for data transmission, according to information about transmission power transmitted from a serving BS.

The transmitter 507 transmits the path loss values output from the receiver 501 or the estimator 503 to the serving BS.

According to an embodiment of the present invention, an operation of acquiring the path loss values may be performed by any one of the receiver 501 and the estimator 503 at a particular time.

Figure 6:
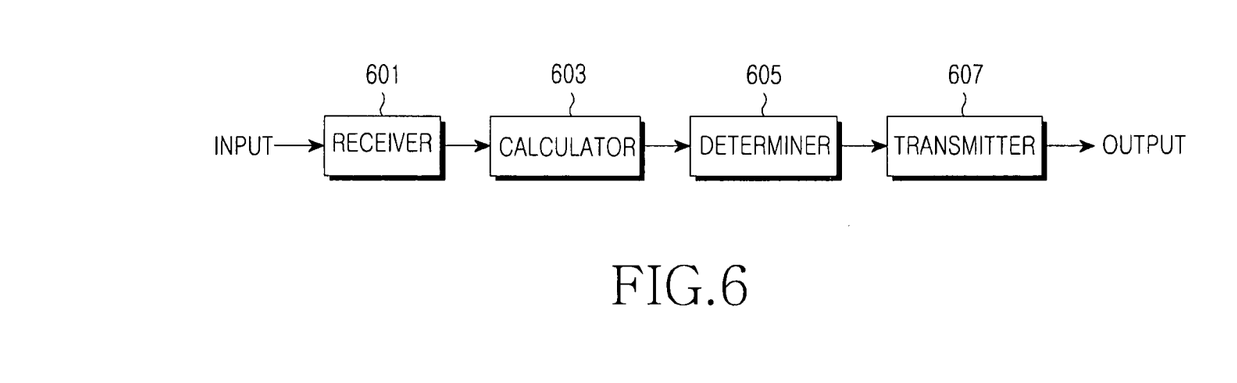
FIG. 6 illustrates a Serving BS for controlling uplink transmission power in a wireless communication system according to an embodiment of the present invention.

FIG. 6 illustrates a serving BS for controlling uplink transmission power in a wireless communication system according to an embodiment of the present invention.

Referring to FIG. 6, the serving BS includes a receiver 601, a calculator 603, a determiner 605, and a transmitter 607.

The receiver 601 receives NI values from adjacent BSs, and receives a path loss value from a terminal.

The calculator 603 calculates transmission power using the received NI values and path loss value. The transmission power may be calculated using the above-described method of maximizing an uplink sum rate of the entire network and method of maximizing an uplink sum log rate of the entire network.

The determiner 605 determines whether the transmission power calculated by the calculator 603 is less than the minimum transmission power, and outputs any one of the calculated transmission power and the minimum transmission power according to the determination results. To be specific, the determiner 605 outputs the minimum transmission power if the calculated transmission power is less than the minimum transmission power, and outputs the calculated transmission power if the calculated transmission power is greater than or equal to the minimum transmission power.

The transmitter 607 transmits the transmission power output from the determiner 605, to the terminal.

Figure 7:
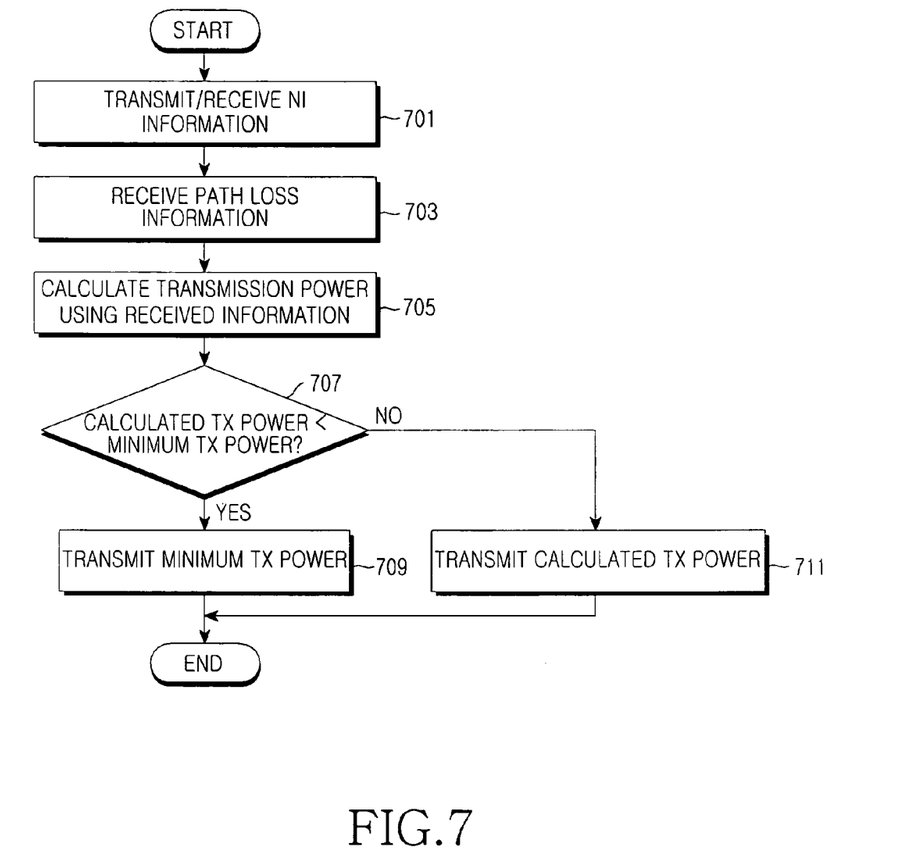
FIG. 7 illustrates a process in a base station for controlling uplink transmission power in a wireless communication system according to an embodiment of the present invention.

FIG. 7 illustrates a process in a serving BS for controlling uplink transmission power in a wireless communication system according to an embodiment of the present invention.

In block 701, a serving BS 110 transmits its NI information to adjacent BSs 130a-130f, and receives NI information of the adjacent BSs 130a-130f from the adjacent BSs 130a-130f, respectively. That is, the serving BS 110 exchanges NI information with the adjacent BSs 130a-130f.

In block 703, the serving BS 110 receives path loss informant from a terminal 115. In block 705, the serving BS 110 calculates transmission power of the terminal 115 using the received NI information and path loss information. The transmission power may be calculated using the aforesaid method of maximizing an uplink sum rate of the entire network and method of maximizing an uplink sum log rate of the entire network.

In block 707, the serving BS 110 determines whether the calculated transmission power is less than the minimum transmission power. If the calculated transmission power is less than the minimum transmission power, the serving BS 110 transmits the minimum transmission power to the terminal 115 in block 709. In contrast, if the calculated transmission power is greater than or equal to the minimum transmission power, the serving BS 110 transmits the calculated transmission power to the terminal 115 in block 711.

As is apparent from the foregoing description, embodiments of the present invention can control uplink transmission power taking into account not only the path loss between the serving BS and the terminal, but also the interference affecting the adjacent BSs. As a result, the sum log rate of all terminals in the network can be maximized, contributing to effective improvement of the uplink rate.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus configured to control transmission power by a Base Station (BS) of a wireless communication system, the apparatus comprising:
   a receiver configured to receive information about interference from one or more adjacent BSs and a terminal; and
   a calculator configured to:
      calculate a transmission power of the terminal using the information about interference received from the adjacent BSs and the terminal; and
      calculate the transmission power of the terminal according to an average data capacity of adjacent cells associated with the adjacent BSs and an average data rate of the terminal,
   wherein the information about interference received from the adjacent BSs comprises Noise & Interference (NI) values, and the information about interference received from the terminal comprises a path loss value,
   wherein the transmission power of the terminal is calculated according to a minimum transmission power set to satisfy a minimum Signal-to-Interference Ratio (SINR) of the terminal, and
   wherein the transmission power of the terminal is configured to increase as the average data rate of the terminal is lower, and the transmission power of the terminal is configured to be reduced as the average data capacity of the adjacent cells is lower.

2. The apparatus of claim 1, further comprising a determiner configured to determine whether the calculated transmission power is less than the minimum transmission power, and output one of the calculated transmission power and the minimum transmission power according to the determined result.

3. The apparatus of claim 2, wherein the calculated transmission power is defined as, $$P_n = \max\left(\frac{1}{\sum_{l \neq k}\left(\frac{G_n^{(l)}}{NI^{(l)}}\right)}, P_{min}\right), P_{min} = \frac{NI^{(k)}}{G_n^{(k)}} \cdot SINR_{min}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, $G_n^{(k)}$ denotes a power loss value of up to the k-th BS that the n-th terminal has reported, $NI^{(k)}$ denotes an NI value of the k-th BS, $NI^{(l)}$ denotes an NI value of the l-th adjacent BS, $P_{min}$ denotes a minimum transmission power of the n-th terminal, and $SINR_{min}$ denotes a minimum SINR.

4. The apparatus of claim 2, wherein the calculated transmission power is defined as, $$P_n = \max\left(\frac{1}{\sum_{l \neq k}\left(\frac{G_n^{(l)}}{NI^{(l)}} \frac{1}{N_{UE}} \sum_{n' \in \Omega_l}\left(\frac{1}{R_{n'}^l}\right)\right)} \frac{1}{R_n^k}, P_{min}\right), P_{min} = \frac{NI^{(k)}}{G_n^{(k)}} \cdot SINR_{min}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, $NI^{(l)}$ denotes an NI value of the l-th adjacent BS, $R_{n'}^l$ denotes the average data rate of an n'-th terminal communicating with the l-th adjacent BS, $R_n^k$ denotes the average data rate of the n-th terminal, $P_{min}$ denotes a minimum transmission power of the n-th terminal, and $SINR_{min}$ denotes a minimum SINR.

5. The apparatus of claim 1, wherein the calculated transmission power is defined as, $$P_n = \frac{1}{\sum_{l \neq k}\left(\frac{G_n^{(l)}}{NI^{(l)}}\right)}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, and $NI^{(l)}$ denotes an NI value of the l-th adjacent BS.

6. The apparatus of claim 1, wherein the calculated transmission power is defined as, $$P_n = \frac{1}{\sum_{l \neq k}\left(\frac{G_n^{(l)}}{NI^{(l)}} \frac{1}{N_{UE}} \sum_{n' \in \Omega_l}\left(\frac{1}{R_{n'}^l}\right)\right)} \frac{1}{R_n^k}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, $NI^{(l)}$ denotes an NI value of the l-th adjacent BS, and $R_{n'}^{l}$ denotes the average data rate of an n'-th terminal communicating with the l-th adjacent BS.

7. A method for controlling transmission power by a Base Station (BS) of a wireless communication system, the method comprising:
receiving information about interference from adjacent BSs and a terminal; and
calculating a transmission power of the terminal using the information about interference received from the adjacent BSs and the terminal; and
calculating the transmission power of the terminal according to an average data capacity of adjacent cells associated with the adjacent BSs and an average data rate of the terminal,
wherein the information about interference received from the adjacent BSs comprises Noise & Interference (NI) values, and the information about interference received from the terminal comprises a path loss value,
wherein the transmission power of the terminal is calculated according to a minimum transmission power set to satisfy a minimum Signal-to-Interference Ratio (SINR) of the terminal, and
wherein the transmission power of the terminal increases as the average data rate of the terminal is lower, and the transmission power of the terminal is reduced as the average data capacity of the adjacent cells is lower.

8. The method of claim 7, further comprising:
determining whether the calculated transmission power is less than the minimum transmission power; and
outputting one of the calculated transmission power and the minimum transmission power according to the determined result.

9. The method of claim 8, wherein the calculated transmission power is defined as, $$P_n = \max\left(\frac{1}{\sum_{l \ne k}\left(\frac{G_n^{(l)}}{NI^{(l)}}\right)}, P_{min}\right), P_{min} = \frac{NI^{(k)}}{G_n^{(k)}} \cdot SINR_{min}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, $NI^{(l)}$ denotes an NI value of the l-th adjacent BS, $G_n^{(k)}$ denotes a power loss value of up to the k-th BS, that the n-th terminal has reported, $NI^{(k)}$ denotes an NI value of the k-th BS, $P_{min}$ denotes a minimum transmission power of the n-th terminal, and $SINR_{min}$ denotes a minimum SINR.

10. The method of claim 8, wherein the calculated transmission power is defined as, $$P_n = \max\left(\frac{1}{\sum_{l \ne k}\left(\frac{G_n^{(l)}}{NI^{(l)}} \frac{1}{N_{UE}} \sum_{n' \in \Omega_l}\left(\frac{1}{R_{n'}^l}\right)\right)} \frac{1}{R_n^k}, P_{min}\right), P_{min} = \frac{NI^{(k)}}{G_n^{(k)}} \cdot SINR_{min}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, $NI^{(l)}$ denotes an NI value of the l-th adjacent BS, $R_{n'}^{l}$ denotes the average data rate of an n'-th terminal communicating with the l-th adjacent BS, $R_n^k$ denotes the average data rate of the n-th terminal, $P_{min}$ denotes a minimum transmission power of the n-th terminal, and $SINR_{min}$ denotes a minimum SINR.

11. The method of claim 7, wherein the calculated transmission power is defined as, $$P_n = \frac{1}{\sum_{l \ne k}\left(\frac{G_n^{(l)}}{NI^{(l)}}\right)}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, and $NI^{(l)}$ denotes an NI value of the l-th adjacent BS.

12. The method of claim 7, wherein the calculated transmission power is defined as, $$P_n = \frac{1}{\sum_{l \ne k}\left(\frac{G_n^{(l)}}{NI^{(l)}} \frac{1}{N_{UE}} \sum_{n' \in \Omega_l}\left(\frac{1}{R_{n'}^l}\right)\right)} \frac{1}{R_n^k}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, $NI^{(l)}$ denotes an NI value of the l-th adjacent BS, and $R_{n'}^{l}$ denotes the average data rate of an n'-th terminal communicating with the l-th adjacent BS.

13. An apparatus configured to control transmission power by a terminal of a wireless communication system, the apparatus comprising:
a transmitter configured to transmit information about interference with one or more adjacent Base Stations (BSs) to a serving BS; and
a receiver configured to receive information about transmission power from the serving BS,
wherein the transmission power is configured to be calculated in the serving BS:
using the transmitted information about interference with adjacent BSs and information about interference that the serving BS has received from the adjacent BSs; and
using an average data capacity of adjacent cells associated with the adjacent BSs and an average data rate of the terminal,
wherein the information about interference with adjacent BSs comprises path loss values with the adjacent BSs, and the information about interference that the serving BS has received from the adjacent BSs comprises Noise & Interference (NI) values of the adjacent BSs,
wherein the transmission power is calculated according to a minimum transmission power set to satisfy a minimum Signal-to-Interference Ratio (SINR) of the terminal, and
wherein the transmission power is configured to increase as the average data rate of the terminal is lower, and the transmission power is configured to be reduced as the average data capacity of the adjacent cells is lower.

14. The apparatus of claim 13, wherein the calculated transmission power is defined as, $$P_n = \frac{1}{\sum_{l \neq k}\left(\frac{G_n^{(l)}}{NI^{(l)}}\right)}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, and $NI^{(l)}$ denotes an NI value of the l-th adjacent BS.

15. The apparatus of claim 13, wherein the calculated transmission power is defined as, $$P_n = \max\left(\frac{1}{\sum_{l \neq k}\left(\frac{G_n^{(l)}}{NI^{(l)}}\right)}, P_{min}\right), P_{min} = \frac{NI^{(k)}}{G_n^{(k)}} \cdot SINR_{min}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, $G_n^{(k)}$ denotes a power loss value of up to the k-th BS that the n-th terminal has reported, $NI^{(k)}$ denotes an NI value of the k-th BS, $NI^{(l)}$ denotes an NI value of the l-th adjacent BS, $P_{min}$ denotes a minimum transmission power of the n-th terminal, and $SINR_{min}$ denotes a minimum SINR.

16. The apparatus of claim 13, wherein the calculated transmission power is defined as, $$P_n = \frac{1}{\sum_{l \neq k}\left(\frac{G_n^{(l)}}{NI^{(l)}} \frac{1}{N_{UE}} \sum_{n' \in \Omega_l}\left(\frac{1}{R_{n'}^l}\right)\right)} \frac{1}{R_n^k}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, $NI^{(l)}$ denotes an NI value of the l-th adjacent BS, and $R_{n'}^l$ denotes the average data rate of an n'-th terminal communicating with the l-th adjacent BS.

17. The apparatus of claim 13, wherein the calculated transmission power is defined as, $$P_n = \max\left(\frac{1}{\sum_{l \neq k}\left(\frac{G_n^{(l)}}{NI^{(l)}} \frac{1}{N_{UE}} \sum_{n' \in \Omega_l}\left(\frac{1}{R_{n'}^l}\right)\right)} \frac{1}{R_n^k}, P_{min}\right), P_{min} = \frac{NI^{(k)}}{G_n^{(k)}} \cdot SINR_{min}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, $NI^{(l)}$ denotes an NI value of the l-th adjacent BS, $R_{n'}^l$ denotes the average data rate of an n'-th terminal communicating with the l-th adjacent BS, $R_n^k$ denotes the average data rate of the n-th terminal, $P_{min}$ denotes a minimum transmission power of the n-th terminal, and $SINR_{min}$ denotes a minimum SINR.

18. A method for controlling transmission power by a terminal of a wireless communication system, the method comprising:

transmitting information about interference with adjacent Base Stations (BSs) to a serving BS; and receiving information about transmission power from the serving BS, wherein the transmission power is calculated in the serving BS:

using the transmitted information about interference with adjacent BSs and information about interference that the serving BS has received from the adjacent BSs; and using an average data capacity of adjacent cells associated with the adjacent BSs and an average data rate of the terminal, wherein the information about interference with adjacent BSs comprises path loss values with the adjacent BSs, and the information about interference that the serving BS has received from the adjacent BSs comprises Noise & Interference (NI) values of the adjacent BSs, wherein the transmission power is calculated according to a minimum transmission power set to satisfy a minimum Signal-to-Interference Ratio (SINR) of the terminal, and wherein the transmission power increases as the average data rate of the terminal is lower, and the transmission power is reduced as the average data capacity of the adjacent cells is lower.

19. The method of claim 18, wherein the calculated transmission power is defined as, $$P_n = \frac{1}{\sum_{l \neq k}\left(\frac{G_n^{(l)}}{NI^{(l)}}\right)}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, and $NI^{(l)}$ denotes an NI value of the l-th adjacent BS.

20. The method of claim 18, wherein the calculated transmission power is defined as, $$P_n = \max\left(\frac{1}{\sum_{l \neq k}\left(\frac{G_n^{(l)}}{NI^{(l)}}\right)}, P_{min}\right), P_{min} = \frac{NI^{(k)}}{G_n^{(k)}} \cdot SINR_{min}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, $G_n^{(k)}$ denotes a power loss value of up to the k-th BS that the n-th terminal has reported, $NI^{(k)}$ denotes an NI value of the k-th BS, $NI^{(l)}$ denotes an NI value of the l-th adjacent BS, $P_{min}$ denotes a minimum transmission power of the n-th terminal, and $SINR_{min}$ denotes a minimum SINR.

21. The method of claim 18, wherein the calculated transmission power is defined as, $$P_n = \frac{1}{\sum_{l \neq k} \left( \frac{G_n^{(l)}}{NI^{(l)}} \frac{1}{N_{UE}} \sum_{n' \in \Omega_l} \left( \frac{1}{R_{n'}^l} \right) \right)} \frac{1}{R_n^k}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, $NI^{(l)}$ denotes an NI value of the l-th adjacent BS, and $R_{n'}^l$ denotes the average data rate of an n'-th terminal communicating with the l-th adjacent BS.

22. The method of claim 18, wherein the calculated transmission power is defined as, $$P_n = \max\left( \frac{1}{\sum_{l \neq k} \left( \frac{G_n^{(l)}}{NI^{(l)}} \frac{1}{N_{UE}} \sum_{n' \in \Omega_l} \left( \frac{1}{R_{n'}^l} \right) \right)} \frac{1}{R_n^k}, P_{min} \right), P_{min} = \frac{NI^{(k)}}{G_n^{(k)}} \cdot SINR_{min}$$

where $P_n$ denotes a transmission power of an n-th terminal communicating with a k-th BS, l denotes an index of an adjacent BS, $G_n^{(l)}$ denotes a path loss value of up to the l-th adjacent BS that the n-th terminal has reported, $NI^{(l)}$ denotes an NI value of the l-th adjacent BS, $R_{n'}^l$ denotes the average data rate of an n'-th terminal communicating with the l-th adjacent BS, $R_n^k$ denotes the average data rate of the n-th terminal, $P_{min}$ denotes a minimum transmission power of the n-th terminal, and $SINR_{min}$ denotes a minimum SINR.

\* \* \* \* \*